United States Patent [19]

Hirama et al.

[11] Patent Number: 5,665,319
[45] Date of Patent: Sep. 9, 1997

[54] METHOD OF SEPARATING CARBON DIOXIDE FROM CARBON DIOXIDE CONTAINING GAS AND COMBUSTION APPARATUS HAVING FUNCTION TO SEPARATE CARBON DIOXIDE FROM THE COMBUSTION GAS

[75] Inventors: Toshimasa Hirama; Hideo Hosoda, both of Sapporo; Kunihiro Kitano, Ebetsu; Tadaaki Shimizu, Niigata, all of Japan

[73] Assignee: Director-General of Agency of Industrial Science and Technology, Japan

[21] Appl. No.: 596,738

[22] Filed: Feb. 5, 1996

Related U.S. Application Data

[62] Division of Ser. No. 470,012, Jun. 6, 1995, abandoned.

[30] Foreign Application Priority Data

Dec. 7, 1994 [JP] Japan .................................. 6-182891

[51] Int. Cl.⁶ .................................................. B01D 50/00
[52] U.S. Cl. .......................... 422/177; 422/173; 422/182; 422/145; 110/203
[58] Field of Search ................................... 422/145, 146, 422/147, 173, 182, 183, 177; 423/175, 230, 231; 110/203, 204, 205, 299

[56] References Cited

U.S. PATENT DOCUMENTS

| 3,617,583 | 11/1971 | Moss ....................................... 263/53 |
| 5,140,950 | 8/1992 | Abdulally ............................... 122/4 D |
| 5,275,788 | 1/1994 | Stoholm ................................. 422/145 |

FOREIGN PATENT DOCUMENTS

0487102A1  11/1991  European Pat. Off. .
63-241098   6/1988   Japan .

OTHER PUBLICATIONS

Chemical Engineering Techniques, Lauer & Heckman 1952, p. 440.

*Primary Examiner*—Christopher Kim
*Attorney, Agent, or Firm*—Lorusso & Loud

[57] ABSTRACT

A method of separating carbon dioxide from a carbon dioxide-containing gas is disclosed, wherein the carbon dioxide-containing gas is contacted with a metal oxide to fix the carbon dioxide as a metal carbonate, and the metal carbonate is thermally decomposed into metal oxide by contact with a combustion gas produced by combusting a fuel with a pure oxygen gas. The metal oxide thus produced is recycled to the previous step for fixation of carbon dioxide. A combustion apparatus is constructed to carry out the above method so that the combustion gas produced is treated to separate the carbon dioxide contained therein.

3 Claims, 3 Drawing Sheets

METHOD OF SEPARATING CARBON DIOXIDE FROM CARBON DIOXIDE CONTAINING GAS AND COMBUSTION APPARATUS HAVING FUNCTION TO SEPARATE CARBON DIOXIDE FROM THE COMBUSTION GAS

This application is a division of application Ser. No. 08/470,012, filed Jun. 6, 1995, abandoned.

BACKGROUND OF THE INVENTION

This invention relates to a method of treating a carbon dioxide-containing gas for the separation of the carbon dioxide therefrom. The present invention also pertains to a combustion apparatus having a function to perform the above method.

In respect of concerns for the atmospheric environment, much attention is now being paid to carbon dioxide ($CO_2$) because of the greenhouse effect caused thereby. Thus, much research has been directed to the reduction, separation, recovery and reuse of $CO_2$ discharged from boilers using fossil fuels.

One known method for the separation and recovery of $CO_2$ from a $CO_2$-containing gas uses a $CO_2$ absorbent or adsorbent such as an amine solution or zeolite particles. The known separation method, however, has a problem because a large sized apparatus is required for carrying out the method.

It is also known to use pure oxygen gas in place of air for combusting a fossil fuel. Since the resulting combustion waste gas is composed of $CO_2$ and a small amount of residual $O_2$, $SO_2$ and $NO_x$, it is not necessary to use a $CO_2$ separation apparatus or it is possible to simplify the $CO_2$ separation apparatus. However, this method is not economically acceptable because of necessity for preparing a large amount of pure oxygen gas.

SUMMARY OF THE INVENTION

It is, therefore, an object of the present invention to provide an economical method which can efficiently and effectively separate $CO_2$ from a $CO_2$-containing gas.

Another object of the present invention is to provide a combustion apparatus which can recover thermal energy generated by the combustion of a fuel, while separating $CO_2$ formed by the combustion.

In accomplishing the foregoing object, there is provided in accordance with the present invention a method of separating carbon dioxide from a carbon dioxide-containing gas, comprising the steps of:

(a) contacting said carbon dioxide-containing gas with a metal oxide to react said carbon dioxide with said metal oxide and to fix said carbon dioxide as the corresponding metal carbonate, and (b) combusting a fuel with oxygen gas in the presence of said metal carbonate to thermally decompose said metal carbonate into said metal oxide.

The present invention also provides a combustion apparatus comprising:

a tubular, vertically extending housing member defining therewithin an upper, fixation chamber and a lower, combustion chamber contiguous to said fixation chamber, said fixation chamber and said combustion chamber being arranged for enclosing a fluidized bed of particles of a metal oxide;

air feeding means provided in a bottom portion of said combustion chamber for feeding air therethrough to said combustion chamber and for maintaining said metal oxide particles in a fluidized state in said fixation chamber and said combustion chamber;

fuel feeding means provided in a lower portion of said combustion chamber for feeding solid fuel particles to said combustion chamber, so that part of said solid fuel particles are combusted within said combustion chamber to form a carbon dioxide-containing gas and to leave uncombusted solid fuel particles;

heat exchanging means disposed within said combustion chamber for recovering part of the heat of said combustion of said solid fuel particles;

temperature controlling means disposed within said fixation chamber for controlling the temperature within said fixation chamber so that said carbon dioxide in said carbon dioxide-containing gas is reacted with said metal oxide particles and fixed as the corresponding metal carbonate in said fixation chamber, thereby to form a carbon dioxide-free gas in said fixation chamber;

a gas-solid separating means connected to an upper portion of said fixation chamber for receiving a mixture containing said metal carbonate particles, said uncombusted solid fuel particles and said carbon dioxide-free gas from said fixation chamber and for separating said mixture into a solid phase containing said metal carbonate particles and said uncombusted solid fuel particles and a gas phase containing said carbon dioxide-free gas;

a decomposition furnace disposed below and connected to said gas-solid separating means to receive said solid phase therefrom;

oxygen feeding means provided in a bottom portion of said decomposition furnace for feeding oxygen gas to said decomposition furnace and for maintaining said solid phase in a fluidized state in said decomposition furnace, so that said uncombusted solid fuel particles are combusted in said decomposition furnace with the simultaneous decomposition of said metal carbonate into said metal oxide, thereby to form a carbon dioxide-rich gas in said decomposition furnace;

withdrawing means provided in a top of said decomposition furnace for withdrawing said carbon dioxide-rich gas therefrom; and transport means extending between said combustion chamber and said decomposition chamber for transporting said metal oxide particles from said decomposition furnace to said combustion chamber.

BRIEF DESCRIPTION OF THE DRAWINGS

Other objects, features and advantages of the present invention will become apparent from the detailed description of the preferred embodiments which follow, when considered in light of the accompanying drawings, in which.

DETAILED DESCRIPTION OF THE PREFERRED EMBODIMENTS OF THE INVENTION

The $CO_2$-containing gas to be treated in the present invention may be a combustible gas such as a $CO_2$- containing natural gas or an incombustible gas such as a waste combustion gas. The content of $CO_2$ in the $CO_2$-containing gas is generally 10–20%. The temperature of the $CO_2$-containing gas is not specifically limited.

The $CO_2$-containing gas is contacted with a metal oxide to react the $CO_2$ with the metal oxide and to fix the $CO_2$ as the corresponding metal carbonate. The metal carbonate thus produced is brought into direct contact with a combustion gas obtained by the combustion of a fuel with pure oxygen gas, so that the metal carbonate is thermally decomposed into the metal oxide. The metal oxide thus obtained is recycled to the above $CO_2$ fixation step.

Any metal carbonate may be used for the purpose of the present invention as long as the carbonate can be thermally decomposed into the corresponding metal oxide and the metal oxide can be converted into the metal carbonate by reaction with $CO_2$ gas. The metal carbonate is preferably an alkaline earth metal carbonate, more preferably calcium carbonate or magnesium carbonate. The metal carbonate (oxide) generally has an average particle size of 0.05–10 mm, preferably 0.1–1 mm, when used in the form of a fluidized bed and 5–50 mm, preferably 10–40 mm, when used in the form of a packed bed.

The fuel used for thermally decomposing the metal carbonate may be any desired gas, liquid or solid fuel, such as coal, petroleum oil or natural gas. The oxygen gas used for the combustion of the fuel preferably has a purity of at least 95%.

The method of the present invention may be carried out in any desired mode such as in a fluidized bed system, a fixed bed system or a flow transporting bed system.

Figure 1:
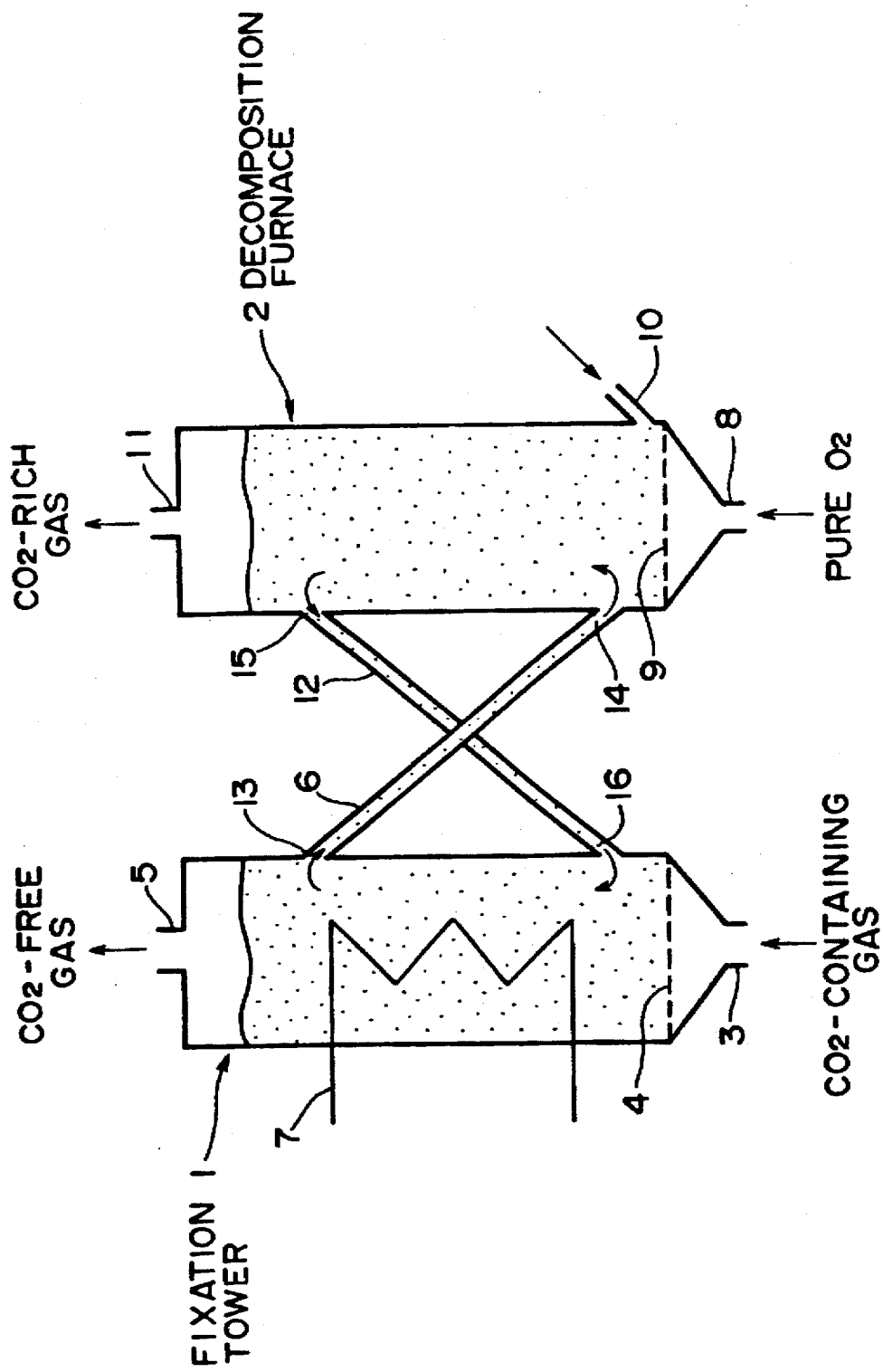
FIG. 1 is a cross-sectional, elevational view diagrammatically showing a $CO_2$ separating apparatus of a fluidized bed-type suitable for carrying out the method of the present invention.

FIG. 1 depicts one embodiment of an apparatus for carrying out the method of the present invention using a fluidized bed system. The following description will be made on an embodiment in which powdery coal is used as the fuel and the $CO_2$-containing gas to be treated is a waste combustion gas. The waste combustion gas generally has a temperature below 1,000° C., preferably 600°–650° C.

Designated generally as 1 is a $CO_2$ fixation tower (first contacting zone) and as 2 a decomposition furnace (second contacting zone). A grid or perforated plate 4 is provided in a lower portion of the $CO_2$ fixation tower 1 to support a mass of the metal oxide particles thereon, while a similar grid 9 is provided in a lower portion of the decomposition furnace 2 to support a mass of the metal carbonate particles thereon.

The $CO_2$ fixation tower 1 has a gas inlet port 3 at a bottom thereof and a gas discharge port 5 at a top thereof. The $CO_2$-containing gas to be treated is fed through the gas inlet port 3 to the tower 1 so that the metal oxide particles are maintained in a fluidized state. Upon contact of the $CO_2$-containing gas with the metal oxide particles, the $CO_2$ is fixed as the corresponding metal carbonate to leave a $CO_2$-free gas which is withdrawn overhead from tower 1 through the discharge port 5.

Disposed within the $CO_2$ fixation tower 1 is a heat exchanger 7 to maintain the temperature therewithin in a range suitable for fixation of $CO_2$ by the metal oxide. When the $CO_2$-containing gas to be treated is a waste combustion gas as described above and when the metal oxide is calcium oxide, for example, the fixation tower 1 is generally maintained at a temperature in the range of 550°–650° C., preferably 600°–620° C., at ambient pressure. The waste combustion gas is thus cooled by the heat exchange with a cooling medium, e.g. water, flowing through the heat exchanger 7.

The amount of the metal oxide particles charged in the fixation tower 1 is generally such that the height (thickness) of the bed of the metal oxide particles in the non-fluidized state is 20–70%, preferably 30–50%, of the height of the fixation tower 1 above the grid 4. The $CO_2$-containing gas is introduced into the fixation tower 1 at such a feed rate that at least 80%, preferably 90–95%, of the $CO_2$ contained in the $CO_2$-containing gas is fixed by the metal oxide and is removed therefrom. Thus, the $CO_2$-free gas discharged from the discharge port 5 is composed mainly of $N_2$ and contains a small amount of unfixed $CO_2$.

The decomposition furnace 2 has a gas inlet port 8 at a bottom thereof, a gas discharge port 11 at a top thereof and a fuel supply port 10 above the grid 9. The powdery coal is introduced into the combustion furnace 2 through the supply port 10. A leg 6 extends between an opening 13 provided at an upper portion of the fixation tower 1 and an opening 14 provided at a lower portion of the decomposition furnace 2, so that part of the fluidized mass in the fixation tower, i.e. the metal carbonate formed by the reaction of the metal oxide with $CO_2$, flows downward through the leg 6 by gravity and enters the decomposition furnace 2.

A pure $O_2$ gas is fed through the gas inlet port 8 to the furnace 2 so that the metal carbonate particles and the powdery coal are maintained in a fluidized state and the coal is burnt with the simultaneous thermal decomposition of the metal carbonate into the metal oxide, thereby to form a $CO_2$-rich gas which is withdrawn overhead from the furnace 2 through the discharge port 11. The combustion in the furnace 2 is performed so that the temperature within the furnace is maintained at a temperature higher than the decomposition point of the metal carbonate. When the metal carbonate is calcium carbonate, for example, the temperature within the furnace 2 is maintained within the range of 900°–1,000° C., preferably 920°–950° C. at ambient pressure. The temperature may be controlled by the control of the feed rate of the powdery coal. The $CO_2$-rich gas withdrawn from the furnace 2 is substantially free of $N_2$, since pure oxygen gas is used for the combustion of the powdery coal.

Designated as 12 is a leg extending between an opening 15 provided at an upper portion of the decomposition furnace 2 and an opening 16 provided at a lower portion of the fixation tower 1, so that part of the fluidized mass in the combustion furnace 2, i.e. the metal oxide formed by the thermal decomposition of the metal carbonate, flows downward through the leg 12 by gravity and is recycled to the fixation tower 1. Thus, part of the combustion heat generated in the decomposition furnace 2 is recovered in the fixation tower 1 by the heat exchanger 7.

When powdery coal is used as the fuel, ash is accumulated in the solid mass circulated between the fixation tower 1 and the decomposition furnace 2. To maintain the ash content below a predetermined level, a portion of the solid mass is discarded through, for example, a discharge pipe (not shown) branched from the leg 6. A make up metal carbonate may be supplied through the port 10 together with the powdery coal. The decomposition furnace 2 is generally provided with an auxiliary burner (not shown) used in starting up the process.

Figure 2:
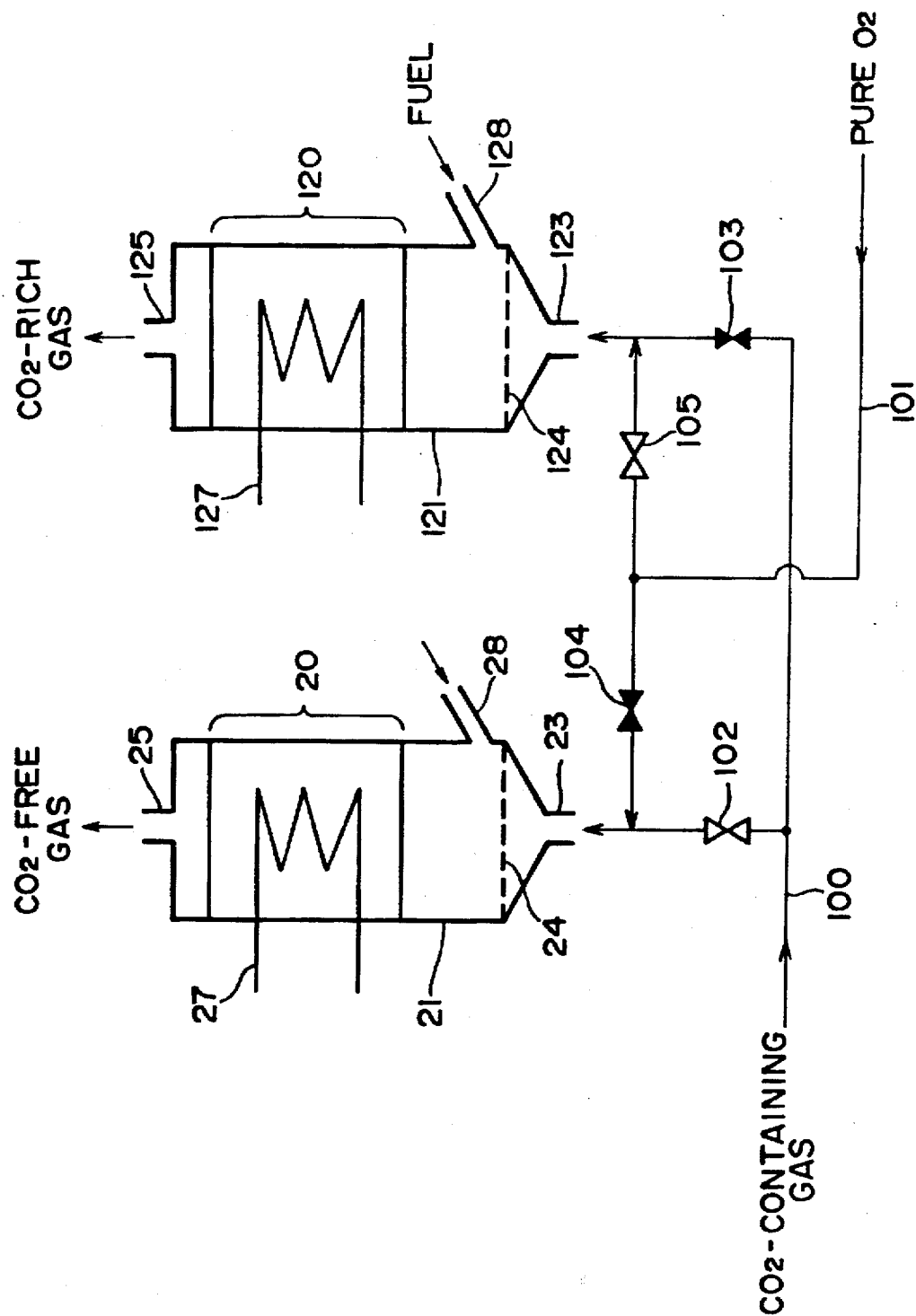
FIG. 2 is a cross-sectional, elevational view diagrammatically showing a $CO_2$ separating apparatus of a packed bed-type suitable for carrying out the method of the present invention.

FIG. 2 depicts another embodiment of an apparatus for carrying out the method of the present invention using a packed bed system. The following description will be made on an embodiment in which the $CO_2$-containing gas to be treated is a waste combustion gas. Designated as 21 is a first contacting zone (furnace) containing a fixed bed of a metal oxide 20 and as 121 a second contacting zone (furnace) containing a fixed bed of the corresponding metal carbonate 120. The reference numerals 23 and 123 each designate a gas inlet port, 24 and 124 each designate a flow control plate, 25 and 125 each designate a gas discharge port, 27 and 127 each designate a heat exchanger, and 28 and 128 each designate a fuel supply port.

A waste combustion gas to be treated is fed through a line 100, a valve 102 and a gas inlet port 23 to the furnace 21, whereas a pure oxygen gas is fed through a line 101, a valve 105 and a gas inlet port 123 to the furnace 121. A liquid or gaseous fuel is supplied to the furnace 121 through the supply port 128 and is combusted therein. The waste combustion gas introduced into the furnace 21 is passed through the metal oxide bed 20 while controlling the temperature of the bed 20 with the heat exchanger 27 so that $CO_2$ contained therein is fixed as the corresponding metal carbonate. The waste combustion gas from which $CO_2$ has been thus removed is discharged from the furnace 21 through the port 25. In the furnace 121, on the other hand, the combustion gas formed by the combustion of the fuel with the pure oxygen gas is passed through the metal carbonate bed 120 while controlling the temperature of the bed 120 with the heat exchanger 127 so that the metal carbonate is thermally decomposed into the metal oxide to form a $CO_2$-rich gas which is withdrawn from the furnace 121 through the discharge port 125.

After the $CO_2$ fixation in the furnace 21 and the $CO_2$ liberation in the furnace 121 have been continued for a given period of time, the valves 102 and 105 are closed and the valves 103 and 104 are opened so that the $CO_2$ fixation and the $CO_2$ liberation are effected in the furnaces 121 and 21, respectively. The valves are thus periodically switched so that the $CO_2$ fixation and the $CO_2$ liberation are alternately carried out in each of the furnaces 21 and 121, thereby to continuously perform the process.

In the foregoing embodiments shown in FIGS. 1 and 2, a high temperature waste combustion gas is described as being used as the $CO_2$-containing gas. When, for example, a $CO_2$-containing natural gas is treated, the temperature at which the $CO_2$ fixation is carried out is suitably selected in view of the temperature of the natural gas.

Figure 3:
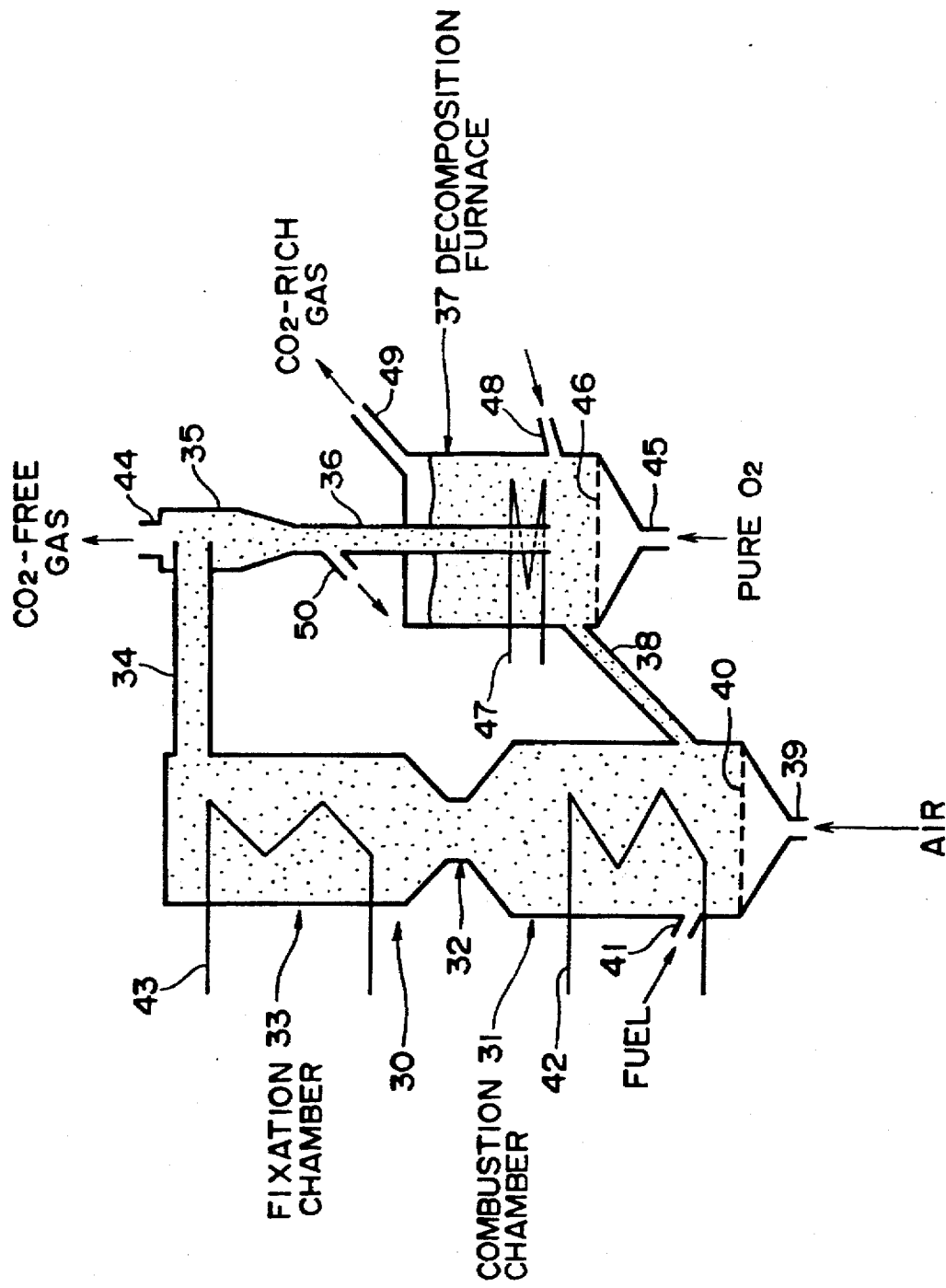
FIG. 3 is a cross-sectional, elevational view diagrammatically showing an embodiment of a combustion apparatus according to the present invention.

FIG. 3 depicts a combustion apparatus, such as a boiler or a waste incinerator, which can recover a thermal energy generated by the combustion of a fuel while separating $CO_2$ from the combustion waste gas. The term "fuel" used herein is intended to refer to any gaseous, liquid or solid combustible material including fossil fuels and waste materials. In the embodiment shown in FIG. 3, solid fuel particles (e.g. powdery coal) are used as the fuel.

Designated generally as 30 is a tubular, vertically extending housing member defining therewithin an upper, fixation chamber 33 and a lower, combustion chamber 31 contiguous to the fixation chamber 33. The fixation chamber 33 and the combustion chamber 31 are connected by a necked portion 32 and are arranged for enclosing a fluidized bed of particles of a metal oxide supported on a perforated plate or grid 40.

Air feeding means 39 is provided in a bottom portion of the combustion chamber 31 for feeding air therethrough to the combustion chamber 31 and for maintaining the metal oxide particles in a fluidized state in the fixation chamber 33 and the combustion chamber 31. Fuel feeding means 41 is provided at a lower portion of the combustion chamber 31 above the grid 40 for feeding solid fuel particles to the combustion chamber 31, so that part of the solid fuel particles are combusted within the combustion chamber 31 to form a $CO_2$-containing gas and to leave uncombusted solid fuel particles.

Disposed within the combustion chamber 31 is heat exchanging means 42 for recovering part of the heat of the combustion of the fuel and for maintaining the temperature within the combustion chamber 31 in a suitable range of for example 800°–900° C.

Temperature controlling means 43 such as a heat exchanger is disposed within the fixation chamber 33 for maintaining the fixation chamber 33 at a temperature (e.g. about 600°–700° C. at ambient pressure when the metal oxide is CaO) suitable to react the $CO_2$ contained in the $CO_2$-containing gas with the metal oxide particles and to fix same as the corresponding metal carbonate in the fixation chamber 33, thereby to form a $CO_2$-free gas in the fixation chamber 33.

Connected to an upper portion of the fixation chamber 33 by a connecting pipe 34 is a gas-solid separator 35 for receiving a mixture of the metal carbonate particles, the uncombusted solid fuel particles and the $CO_2$-free gas from the fixation chamber 33 and for separating the mixture into a solid phase containing the metal carbonate particles and the uncombusted solid fuel particles and a gas phase containing the $CO_2$-free gas. The gas-solid separator 35 has a discharge port 44 at a top thereof for withdrawing the $CO_2$-free gas.

A decomposition furnace 37 is disposed below and connected to the gas-solid separator 35 to receive the solid phase therefrom. Thus, the gas-solid separator 35 has a downcomer tube 36 extending into the decomposition furnace. The decomposition furnace 37 has a bottom portion provided with an oxygen feed port 45. A pure oxygen gas is fed through the port 45 to the decomposition furnace 37 for maintaining the solid phase, supplied from the separator 35 through the downcomer tube 36, in a fluidized state in the decomposition furnace 37, so that uncombusted solid fuel particles contained in the solid phase are combusted. By the combustion of the uncombusted solid fuel particles, the temperature within the furnace 37 is higher than the decomposition temperature of the metal carbonate contained in the solid phase, so that the metal carbonate particles contained is converted into the metal oxide, thereby to form a $CO_2$-rich gas in the decomposition furnace 37. Designated as 47 is a heat exchanger for maintaining the temperature within the decomposition furnace at a suitable range, for example, in the range of 950°–1,000° C. when the metal carbonate is calcium carbonate.

The decomposition furnace is provided with a gas discharge port 49 at a top thereof for withdrawing the $CO_2$-rich gas therefrom. Extending between a lower portion of the combustion chamber 31 and an upper portion of the decomposition chamber 37 is a pipe 38 for recycling the metal oxide particles from the decomposition furnace 37 to the combustion chamber 31.

Designated as 50 is a discharge pipe branched from the downcomer tube 36 for discarding a part of the solid phase and for maintaining the amount of the ash produced by the combustion of the solid fuel particles and accumulated in the system below a predetermined level. Such a discharge pipe may be connected to the pipe 38, if desired. Designated as 48 is a port for supplying a make up metal carbonate. When the fuel supplied from the port 41 to the combustion chamber 31 is a gaseous or liquid fuel, it is necessary to feed the same or different fuel to the decomposition furnace 37. Further, if desired, an additional fuel may be fed to the decomposition furnace 37 even when the solid fuel such as powdery coal is used in the combustion chamber 31. Each of the combustion chamber 31 and the decomposition furnace 37 is generally provided with an auxiliary burner (not shown) used in starting up the process.

Since the metal oxide particles must be not only fluidized in the combustion chamber 31 and the fixation chamber 33 but also be introduced into the solid-gas separator 35, it is necessary that the gas flow velocity in these chambers 31 and 33 is sufficiently high. On the other hand, the metal carbonate particles in the decomposition furnace 37 need not be highly fluidized and are preferably maintained in a bubbling fluidization state.

The combustion intensity in the decomposition furnace 37 can be much lower than that of the combustion chamber 31 and is generally about 2/3 of that of the combustion chamber 31. Thus, the amount of the pure oxygen gas fed to the decomposition furnace 37 is much smaller than that required in the conventional pure oxygen-type combustion device. The mass flux (or circuration rate) of the metal oxide in the whole loop is generally at least 3 times, preferably 10–20 times, the coal feed rate.

The combustion device may be operated at ambient pressure or under a pressurized state. Due to equilibrium, the fixation chamber 33 should be operated at a temperature lower than that in the combustion chamber 31, when these chambers are operated at ambient pressure. Under a pressurized condition, the two chambers can be operated at the same temperature and can be constructed into a single common chamber. For example, over 80% of the $CO_2$ may be separated in a single chamber operated at 800° C. and at 10 atm.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A combustion apparatus comprising:

a tubular, vertically extending housing member and separating means for dividing said housing member into an upper, fixation chamber and a lower, combustion chamber contiguous to said fixation chamber, said fixation chamber and said combustion chamber containing a fluidized bed of particles of a metal oxide;

air feeding means provided in a bottom portion of said combustion chamber for feeding air through said housing to maintain said metal oxide particles in a fluidized state in said fixation chamber and said combustion chamber;

fuel feeding means provided in a lower portion of said combustion chamber for feeding solid fuel particles to said combustion chamber, so that part of said solid fuel particles are combusted to provide a first combustion zone within said combustion chamber, to form a carbon dioxide-containing gas and to leave uncombusted solid fuel particles;

heat exchanging means disposed within said combustion chamber for recovering part of the heat of said combustion of said solid fuel particles;

temperature controlling means, operative independently of said heat exchange means and disposed within said fixation chamber, for controlling the temperature within said fixation chamber so that said carbon dioxide in said carbon dioxide-containing gas is reacted with said metal oxide particles and fixed as the corresponding metal carbonate in said fixation chamber, thereby to form a carbon dioxide-free gas in said fixation chamber;

a gas-solid separating means connected to an upper portion of said fixation chamber for receiving a mixture containing said metal carbonate particles, said uncombusted solid fuel particles and said carbon dioxide-free gas from said fixation chamber and for separating said mixture into a solid phase containing said metal carbonate particles and said uncombusted solid fuel particles and a gas phase containing said carbon dioxide-free gas;

a first gas outlet for venting said carbon dioxide-free gas from said combustion apparatus;

a decomposition furnace providing a second combustion zone disposed below and connected to said gas-solid separating means to receive said solid phase therefrom;

oxygen feeding means provided in a bottom portion of said decomposition furnace for feeding oxygen gas to said decomposition furnace and for maintaining said solid phase in a fluidized state in said decomposition furnace, so that said uncombusted solid fuel particles are combusted in said decomposition furnace with the simultaneous decomposition of said metal carbonate into said metal oxide, thereby to form a carbon dioxide-rich gas in said decomposition furnace;

a second gas outlet provided in a top of said decomposition furnace for withdrawing said carbon dioxide-rich gas therefrom; and transport means extending between said combustion chamber and said decomposition chamber for transporting said metal oxide particles from said decomposition furnace to said combustion chamber.

2. A combustion apparatus as claimed in claim 1, further comprising feed port means provided in said decomposition furnace for supplying an auxiliary fuel to said decomposition furnace.

3. A combustion apparatus as claimed in claim 1 wherein said separating means is a constricted neck portion of said housing member.

* * * * *